(12) United States Patent
Kucher (10) Patent No.: US 7,197,424 B2
(45) Date of Patent: Mar. 27, 2007

(54) POSITION SENSING SYSTEM FOR MOVEABLE MEMBER

(75) Inventor: Trent Steven Kucher, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 37 days.

(21) Appl. No.: 11/094,383

(22) Filed: Mar. 31, 2005

(65) Prior Publication Data

US 2006/0229841 A1 Oct. 12, 2006

(51) Int. Cl.
*G06F 15/00* (2006.01)

(52) U.S. Cl. .................. 702/150; 382/278; 382/313; 382/312; 358/473

(58) Field of Classification Search ............. 702/150; 382/278, 287, 289, 294, 295, 299, 300, 305, 382/312, 313, 314; 345/613, 672; 358/473
See application file for complete search history.

(56) References Cited

U.S. PATENT DOCUMENTS

| | | | |
|---|---|---|---|
| 5,243,665 A * | 9/1993 | Maney et al. | 382/152 |
| 6,327,791 B1 * | 12/2001 | Norcross et al. | 33/706 |
| 6,556,946 B2 | 4/2003 | Sewell | |
| 6,566,862 B1 * | 5/2003 | Goto et al. | 324/207.16 |
| 6,690,160 B2 * | 2/2004 | Gray et al. | 324/207.24 |
| 6,834,574 B2 * | 12/2004 | Neumann | 91/1 |
| 6,990,254 B2 * | 1/2006 | Nahum | 382/278 |
| 6,996,291 B2 * | 2/2006 | Nahum | 382/278 |
| 7,047,865 B2 * | 5/2006 | Neumann | 91/1 |
| 7,065,258 B2 * | 6/2006 | Nahum | 382/278 |
| 2002/0179819 A1 * | 12/2002 | Nahum | 250/208.1 |
| 2003/0048466 A1 * | 3/2003 | Yamada et al. | 358/1.12 |
| 2003/0131724 A1 * | 7/2003 | Neumann | 92/5 R |
| 2005/0120875 A1 * | 6/2005 | Neumann | 92/5 R |
| 2005/0274252 A1 * | 12/2005 | Wakabayashi et al. | 83/697 |
| 2006/0022047 A1 * | 2/2006 | Sewell et al. | 235/454 |
| 2006/0087314 A1 * | 4/2006 | Zhu et al. | 324/207.17 |
| 2006/0113847 A1 * | 6/2006 | Randall et al. | 310/12 |

OTHER PUBLICATIONS

U.S. Appl. No. 11/045,811, filed Jan. 31, 2005, Pawelski et al.
G. Gordon et al., *Silicon Optical Navigation*, The Mechanical Computer Mouse, pp. 1-7, http://www.labs.agilent.com/news/2003features/Gordon_optical_nav.pdf.

* cited by examiner

*Primary Examiner*—Carol S. W. Tsai
(74) *Attorney, Agent, or Firm*—Finnegan, Henderson, Farabow, Garrett & Dunner (57) ABSTRACT

A method of monitoring a position of a movable member having a surface is provided. The method includes sensing an image of a portion of the surface of the movable member and identifying a stored image in a memory corresponding to the sensed image. The method further includes identifying a location of the movable member corresponding to the stored image. The stored image is replaced with the sensed image in the memory.

25 Claims, 9 Drawing Sheets

POSITION SENSING SYSTEM FOR MOVEABLE MEMBER

TECHNICAL FIELD

The present disclosure is directed generally to a system and related method for determining a location of a movable member, and more particularly, to determining the linear position of a movable member.

BACKGROUND

Many construction and earthmoving machines use hydraulic or pneumatic cylinders for moving linkages and associated work tools, such as liftarms and buckets of a wheel loaders. The cylinder includes a rod coupled to the work tool or a linkage member, at one end, and a chamber at the other end coupled to the machine or another linkage member. Hydraulic fluid is provided in the chamber to extend the rod along a linear path up to several meters in length. The fluid can also be removed from the chamber to retract the rod along the same path. Often the rod location or position along the linear path must be known so that movement of the work tool can be controlled.

Barcodes have been marked on cylinder rods in order to locate the position of the rod. In particular, the rod may be marked with a barcode including non-repeating segments of code, each of which correspond to a different location of the rod. In operation, a sensor is provided in the cylinder adjacent the barcode to identify a particular segment, which is then associated with a corresponding rod location.

U.S. Pat. No. 6,556,946 issued to Sewell on Apr. 29, 2003, describes a barcode utilizing a trinary code including a succession of data fields, each of which includes so-called "trits" or characters. Data is encoded by varying the relative amounts of black and white in each character. The barcode described in the Sewell patent facilitates accurate location measurements over a range of rod positions.

Barcodes are often marked on the rod by exposing several thousand regions along the entire length of the rod surface to intense laser light. The duration of exposure and the area exposed must be precisely controlled in order to generate a barcode that can be used to accurately locate the rod position. Marking barcodes in this manner, however, can be complicated and time consuming.

The present disclosure is directed to overcome one or more of the shortcomings in the prior art

SUMMARY OF THE INVENTION

Consistent with an aspect of the present disclosure, a method is provided of monitoring a position of a movable member having a surface. The method includes sensing an image of a portion of the surface of the movable member and identifying a stored image in a memory corresponding to the sensed image. The method further includes identifying a location of the movable member corresponding to the stored image, and replacing the stored image with the sensed image in the memory.

Consistent with a further aspect of the present disclosure, a method of manufacturing a movable member is provided, which includes machining the movable member to impart a roughness to a surface of the movable member and generating a plurality of images of the surface of the movable member. The method further includes storing the plurality of images in a memory. Each of the plurality of images is associated with a corresponding one of a plurality of locations of the movable member.

Consistent with an additional aspect of the present disclosure, a position monitoring system is provided which includes a movable member having a surface, a sensor, a memory, and a processor circuit. The sensor is configured to sense an image of the portion of the surface of the movable member. The memory stores a plurality of images and corresponding ones of a plurality of locations of the movable member. In addition, the processor circuit is configured to identify one of the plurality of images stored in the memory corresponding to the sensed image, and associate the sensed image with one of the plurality of locations of the movable member corresponding to the identified one of the plurality of images. The processor circuit is also configured to replace the identified one of the plurality of images with the sensed image in the memory.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
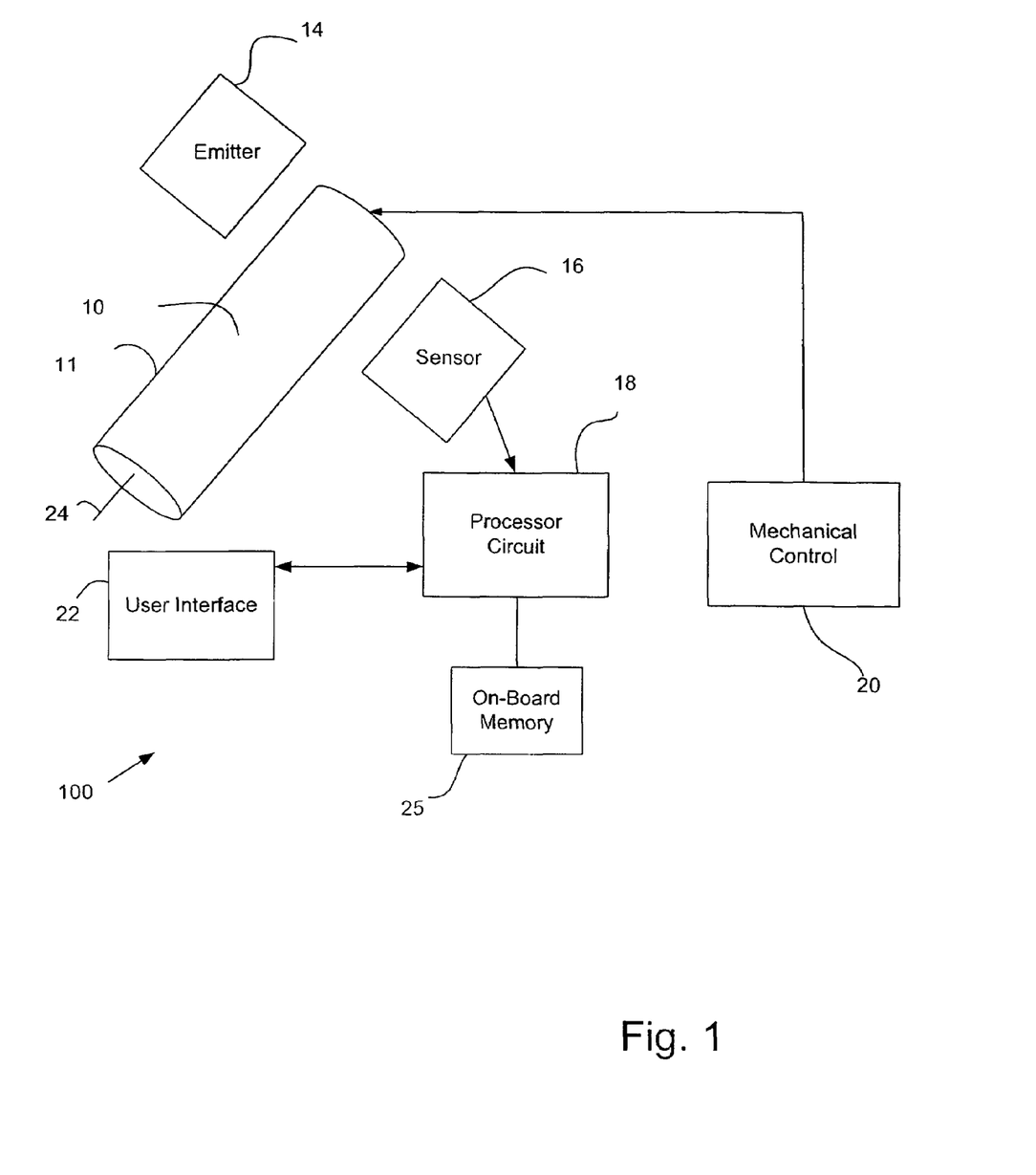
FIG. 1 illustrates a block diagram of a system for identifying a rod location consistent with an aspect of the present disclosure.

FIG. 1 illustrates a block diagram of system 100 for monitoring a position and controlling movement of movable member, object or rod 10. Rod 10 may include a conventional chrome outer surface 11 and a longitudinal axis 24. Preferably, however, surface 11 includes a thermally sprayed coating, which is typically more wear-resistant than chrome. Emitter 14 is optionally provided for illuminating a portion of surface 11, and sensor circuit 16, having an associated viewing area, senses an image of the portion of the surface 11. In addition, rod 10 may be exposed with ambient light, if such light is of sufficient intensity. In that case, emitter 14 may not be required.

In response to the sensed images, sensor circuit 16 generates and supplies sensed images in the form of electrical sense signals to processor circuit 18, which may be a conventional microprocessor, computer, or digital signal processor and associated circuitry. On-board memory 25 is coupled to processor 18, and stores images of portions of surface 11 and corresponding rod locations. Processor circuit 18 compares the sensed image with images stored in on-board memory 25 to thereby identify a stored image corresponding to the sensed image, as well as an associated location of rod 10. Information concerning rod position is optionally displayed on a user interface device 22 including, for example, a display or monitor. In this example, the determined position of rod 10 is an absolute position of the rod, not a relative position compared to a previous position.

A keyboard or other data entry device may also be provided for supply user commands to processor circuit 18. Upon identifying the rod location and in response to the user commands, processor circuit 18 supplies control signals to mechanical control circuit 20, to thereby move or change the location of rod 10. Processor circuit 18 may include any appropriate analog or digital circuitry, such as a digital signal processor, even if such circuitry is physically housed in sensor circuit 16.

On-board memory 25 typically includes a computer readable medium. The term "computer-readable medium" as used herein refers to any medium or combination of media that participates in providing instructions to or stores data for processor circuit 18. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics, and can also take the form of acoustic or light waves, such as those generated during radio-wave and infra-red data communications. Common forms of computer-readable media include, for example, a register, floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer or processor circuit 18 can read.

Consistent with an aspect of the disclosure, processor circuit 18 executes instructions for carrying out or performing a method of identifying a position or location of rod 10. Such instructions may be read into a computer readable medium, such as a memory incorporated into or provided external to processor circuit 18. In alternative embodiments, hard-wired circuitry may be used in place of or in combination with software instructions. Thus, the disclosed system is not limited to any specific combination of hardware circuitry and software.

Figure 2:
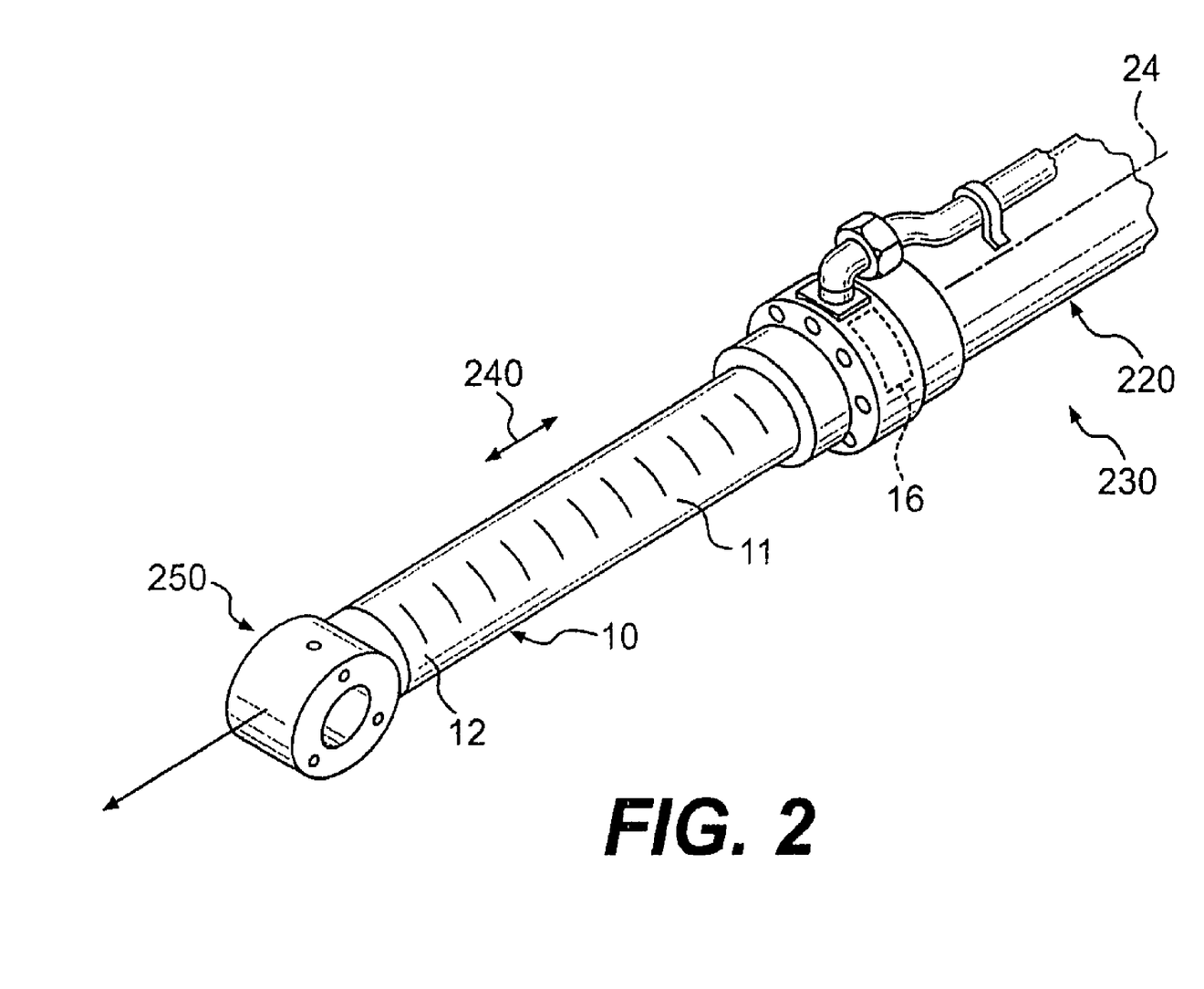
FIG. 2 illustrates a perspective view of a portion of the system shown in FIG. 1.

FIG. 2 illustrates rod 10 disposed in a cylinder body 220. Collectively, rod 10 and cylinder body 220 constitute a cylinder 230, which can be any one of a wide variety of hydraulic, pneumatic and similarly actuated cylinders. Cylinder 230 is operable to extend rod 10 from, and retract rod 10 into, cylinder body 220 typically along a linear path of movement represented by arrow 240. Path 240 typically extends axially with respect to a longitudinal axis 24. Optionally, sensor circuit 16 may be provided in cylinder body 220.

In the embodiment shown in FIG. 2, rod 10 is movable while cylinder body 220 is stationary. The present disclosure, however, is applicable to other rod and cylinder body configurations whereby the rod is stationary and the cylinder body is movable, as well as configurations in which both the rod and cylinder body are movable. As used herein, the term "movable" refers to actual movement of the rod, member or object, as well as relative movement in configurations in which the rod, member or object is stationary but the sensor circuit is movable, and configurations in which both the rod, member or object and the sensor circuit are movable.

Returning to FIG. 1, on board memory 25 stores surface images and associated rod locations after rod 10 has been manufactured and cylinder body 220 has been assembled. Such images are obtained under precisely controlled conditions whereby the rod is moved past sensor 16. The locations can be calculated by processor circuit 16 by comparing successive overlapping images obtained from surface 11. As a result, images of surface 11 and corresponding rod locations are obtained which are then used as a reference to obtain further rod positions.

Figure 3:
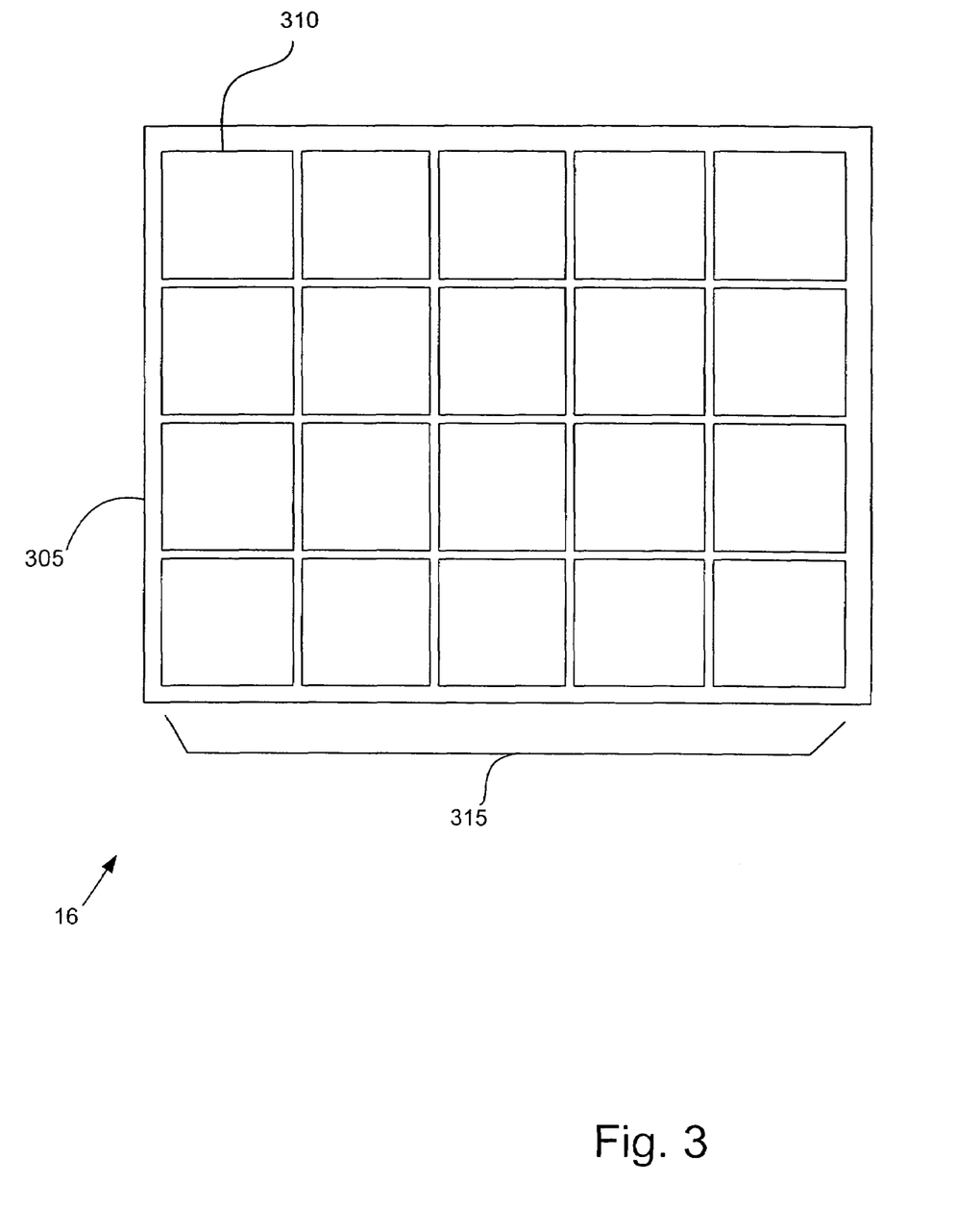
FIG. 3 illustrates is a portion of a sensor circuit consistent with an aspect of the present disclosure.

FIG. 3 illustrates a portion of sensor circuit 16 in greater detail. Sensor circuit 16 typically includes an array 305 of light sensing elements or detectors 310. Detectors 310 may include, for example, photodiodes or other semiconductor photoresponsive devices integrated on a substrate. Typically, array 305 is two-dimensional so that detectors 310 are arranged in both horizontal and vertical directions in FIG. 3. As further shown in FIG. 3, sensor circuit 16 has a viewing area 315 having a width that extends substantially along a width of array 305. Sensor circuit 16 may include a known charge coupled device (CCD) sensor and a digital signal processor (DSP). Although detectors 310 are shown spaced from one another, it is understood that the detectors may also be concatenated.

Figure 4:
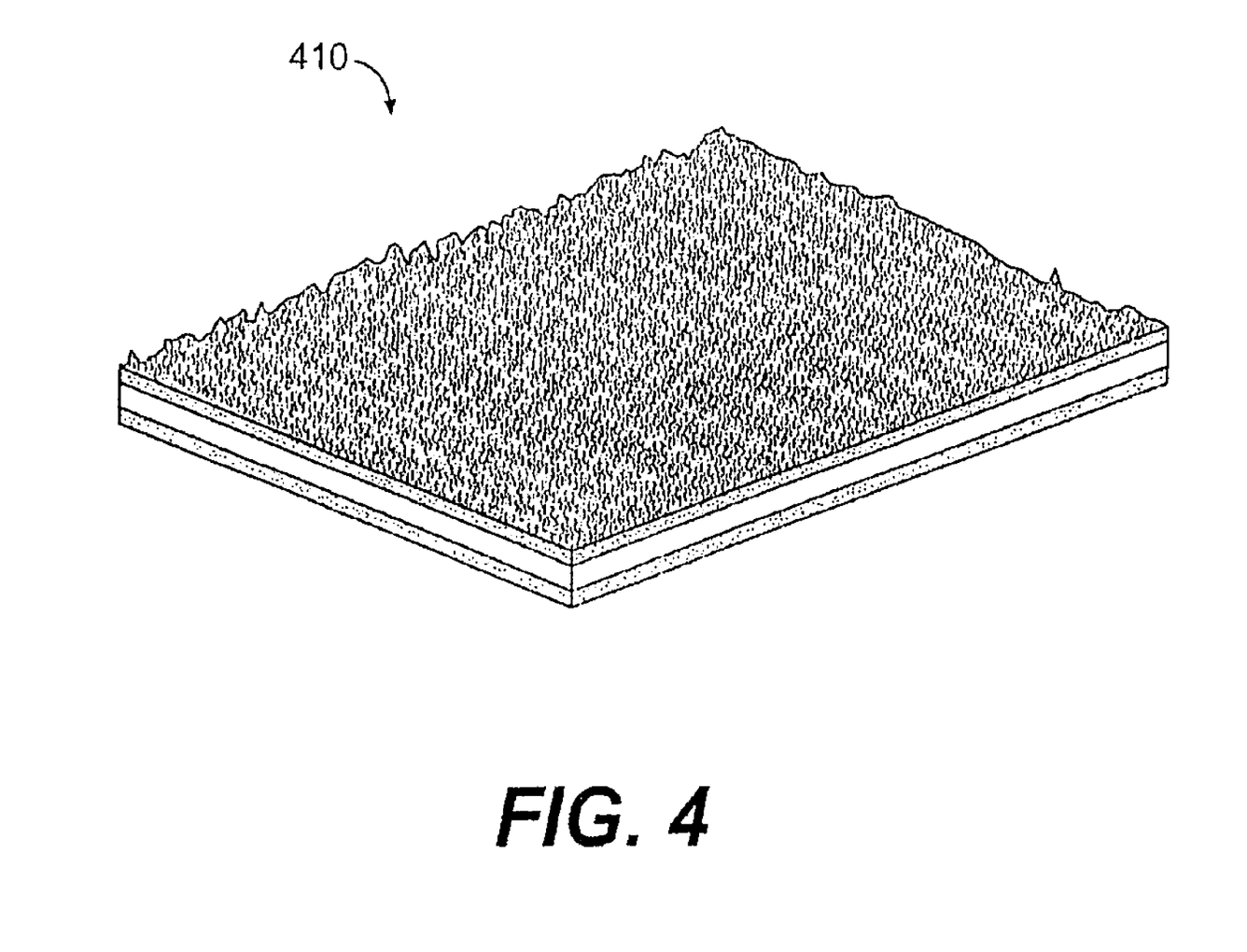
FIG. 4 illustrates a detailed view of a portion of a surface of a rod.

FIG. 4 illustrates an enlarged view of a portion 410 of surface 11. Portion 410, which in this example is 996 µm×1315 µm, has a particular reflectivity associated with surface roughness or irregularities which typically do not exceed 1.44 µm. Such surface roughness scatters light impinging on surface 11 thereby creating an image on sensor circuit 16 which is bright in some portions, but dark in others. The image changes as rod 10 moves past sensor circuit 16, which, in turn, supplies images of the roughness of surface 11 to processor circuit 18. The DSP in sensor circuit 16 can process these images, and can also generate image quality data, such as received light intensity information. As noted above, the term "processor circuit," as used herein, includes digital and/or analog circuitry, even if such circuitry is provided in separate housings or packages. Thus, the DSP in sensor circuit 16 can be considered part of processor circuit 18.

Figure 9:
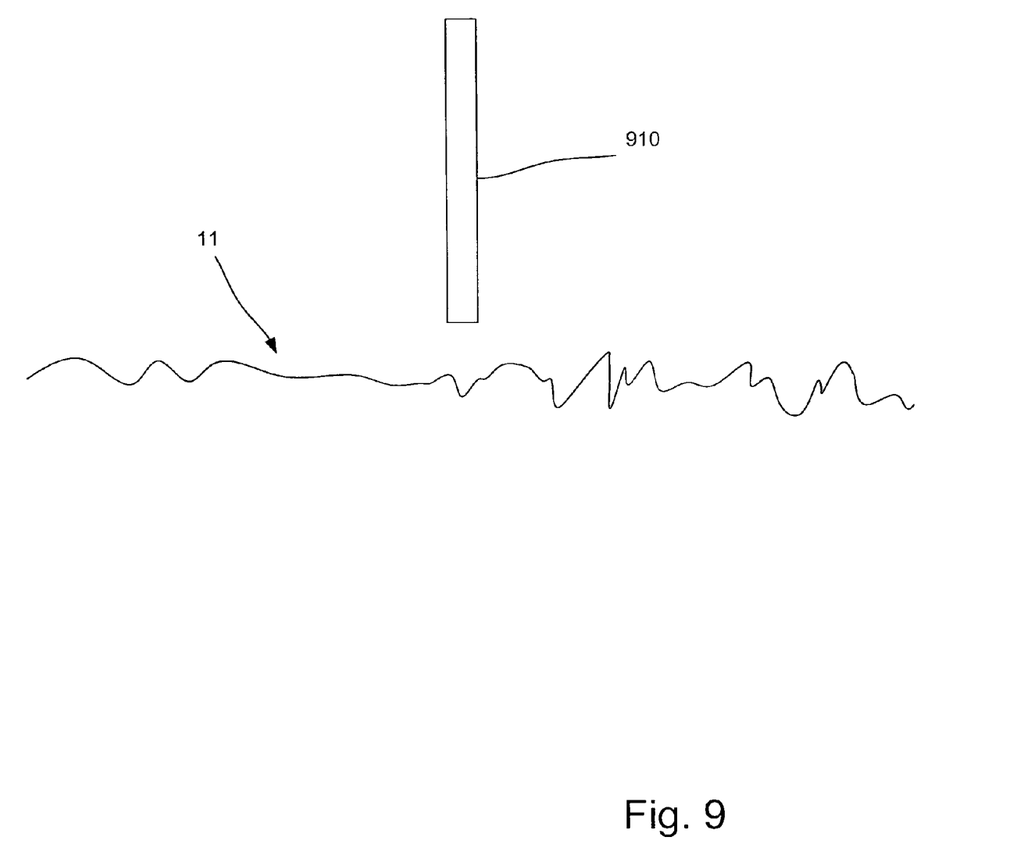
FIG. 9 illustrate a proximity sensor consistent with an aspect of the disclosure.

In the example discussed above, sensor circuit 16 includes optical sensors that detect light reflected off of surface 11. Sensor circuit 16, however, can include other known devices for determining the topology of surface 11 to generate an image thereof. For example, sensor circuit 16 can include one or more known proximity detectors, such as a capacitive proximity detector 910 shown in FIG. 9. As noted above, surface 11 is not entirely smooth, but on a microscopic scale, as further shown in FIG. 9, can include "peaks" and "valleys." Thus, as surface 11 moves past proximity sensor 11, the "peaks" will be closer to sensor 11 than the "valleys," resulting in differences in capacitive coupling between proximity sensor 910 and surface 11. Such capacitive coupling variations can be measured in the form of a current, which can be detected and associated with a given surface profile or image. Alternatively, one or more known styluses can be provided in order to generate the surface image.

As noted above, processor circuit 18 receives images and compares them with images stored in on-board memory 25 to obtain a location of rod 10. A process for generating such stored images will next be described with reference to flowchart 500 shown in FIG. 5.

Figure 5:
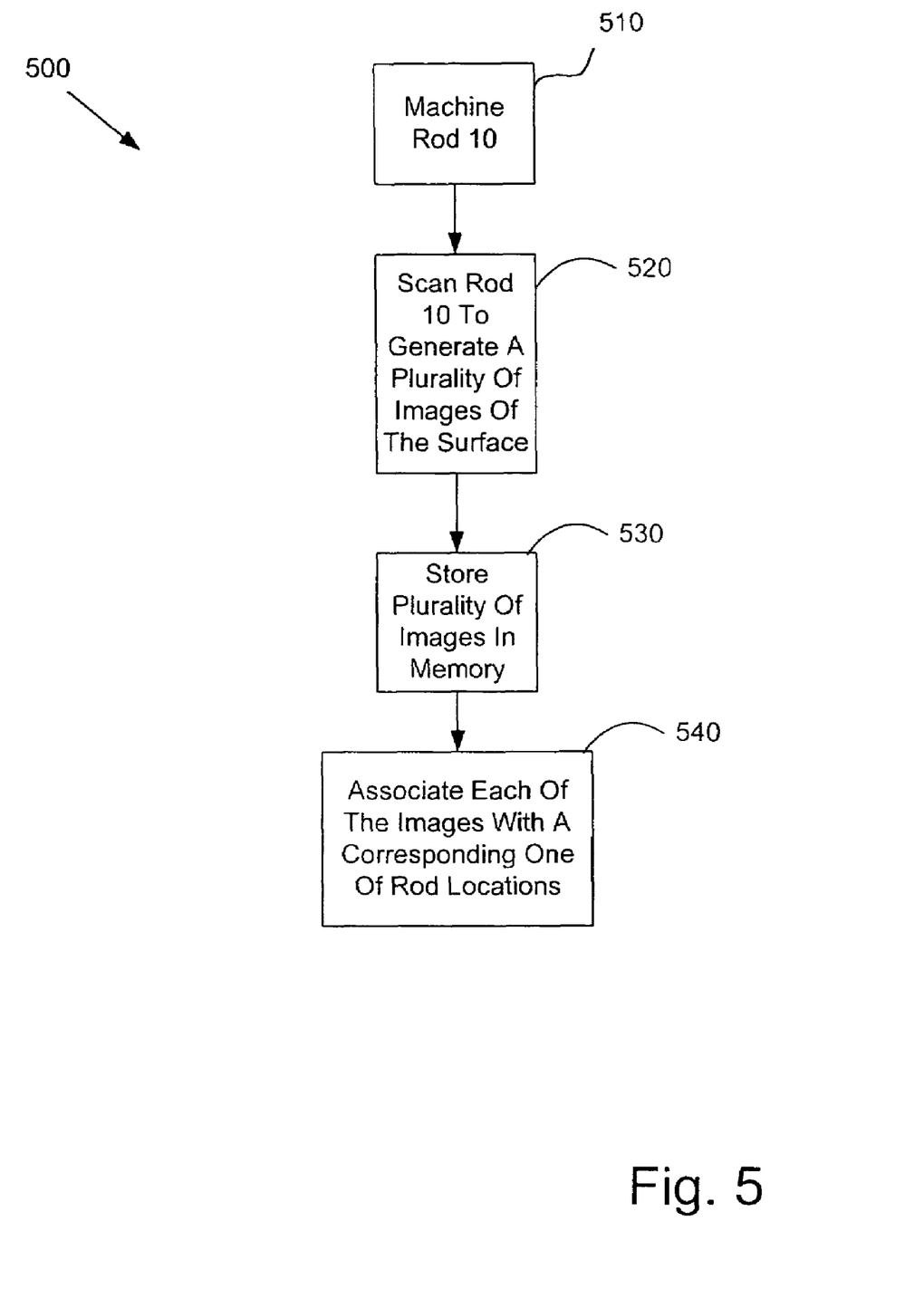
FIG. 5 illustrates a flowchart of a process consistent with an aspect of the present disclosure.
Figure 6:
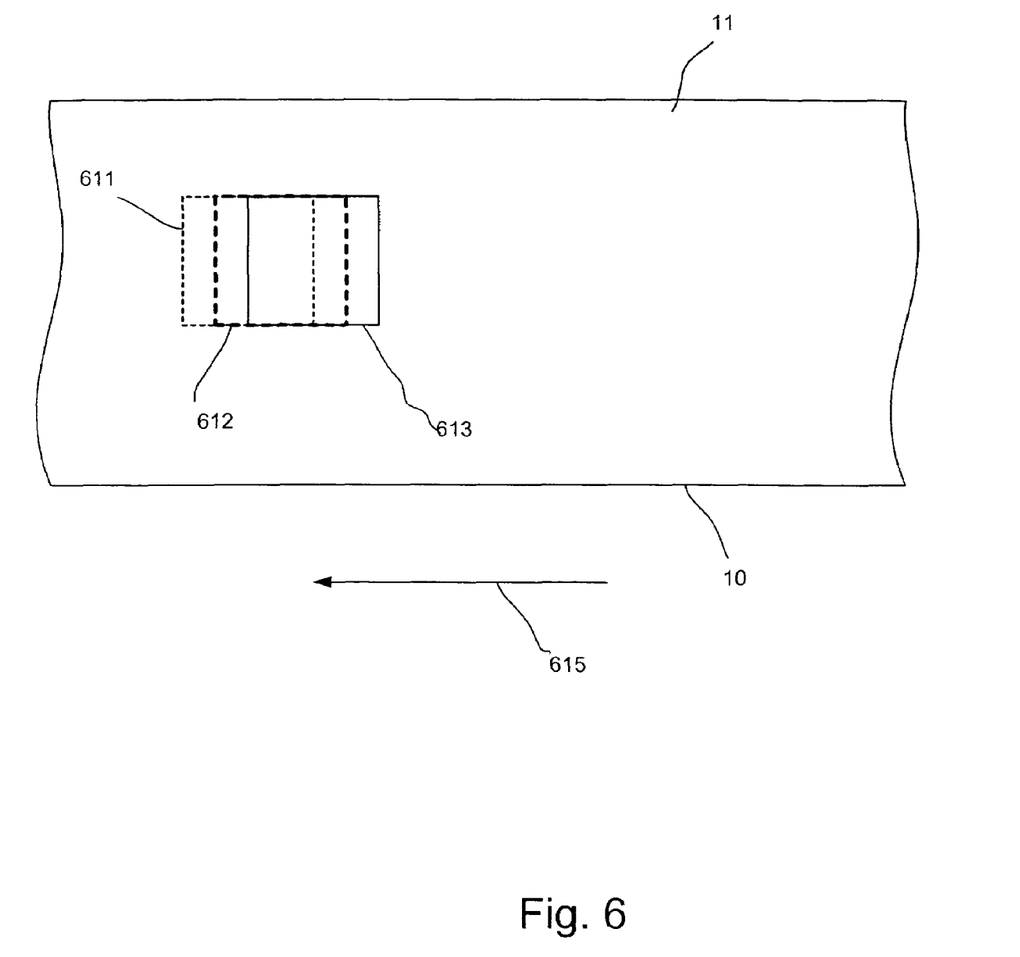
FIG. 6 illustrates a portion of a surface of a rod consistent with a further aspect of the disclosure.

In a first step 510 of flowchart 500, rod 10 is machined and preferably polished in a conventional manner. Cylinder body 220 and rod 10 are assembled to form cylinder 230, which includes sensor circuit 16. Rod 10 is then fully extended, for example, from cylinder body 220, and slowly retracted into cylinder body 220 in a controlled manner. As a result, sensor 16 scans substantially the entire length of rod 10 to generate a plurality of images of surface 11 (step 520). For example, successive images of surface portions 611, 612, and 613 (see FIG. 6), are generated by sensor 16 as rod 10 is moved past viewing area 315 in a direction indicated by arrow 615. Typically, rod 10 moves continuously so that images of portions of the surface 11 overlapping one another can be obtained. Preferably, a large number of such images should be obtained and stored to permit accurate location identification (step 530). With each surface portion sensed, the location of rod 10 is also obtained. Processor 18 receives such location information, and associates each image with a corresponding rod position (step 540). The images, as well as the corresponding rod locations, are stored in on-board memory 25. If array 305 (see FIG. 3) includes a relatively large number of sensors 310, a substantial amount of data can be generated in connection with each image. Accordingly, if desired, the image data can be compressed with known techniques, such that pertinent image data for differentiating positions of rod 10 is stored in on-board memory 25, while unnecessary image data is discarded. As a result, the amount of image data stored in on-board memory 25 can be reduced.

Figure 7:
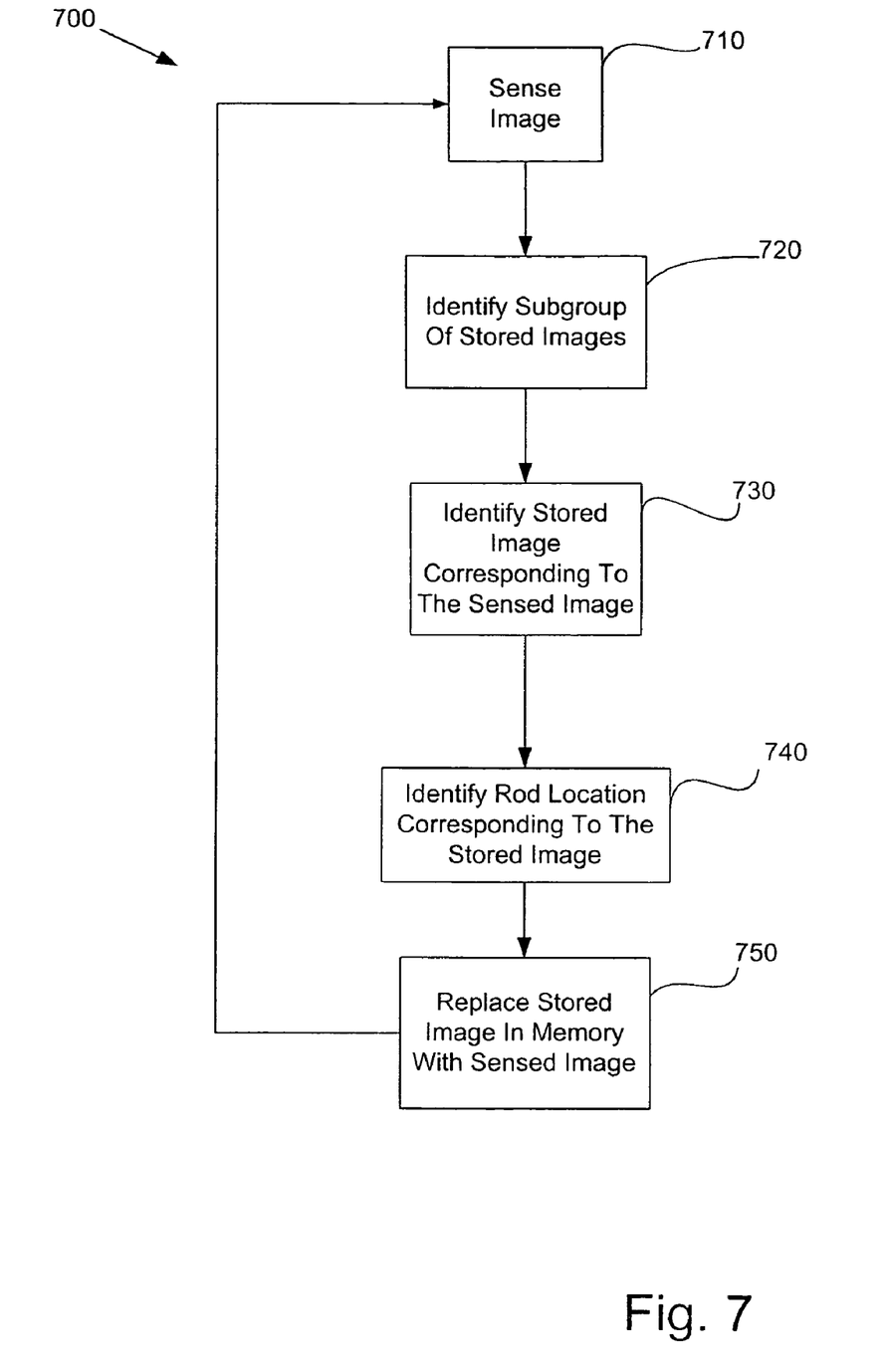
FIG. 7 illustrates a flowchart of a process consistent with an additional aspect of the present disclosure.

Further operation of system 100 will next be described in connection with flowchart 700 shown in FIG. 7.

In step 710 of flowchart 700, an image of a portion of surface 11 is sensed by sensor circuit 16 in a manner similar to that described above. Instead of comparing the sensed image with each and every image stored in on-board memory 25, however, a subgroup of stored images may be selected and the sensed image is compared with those stored images within the subgroup (step 720). The subgroup is determined based on a limiting parameter, such as one or more of the following: the previous location of rod 10, a limit of the velocity of rod 10, a limit of the acceleration of rod 10, and a sampling rate of sensor circuit 16, e.g., a time difference or interval between a first time in which a previous image of a previous portion of the surface of rod 10 was sensed and a second time at which another image of another portion of the surface of rod 10 is sensed.

Figure 8:
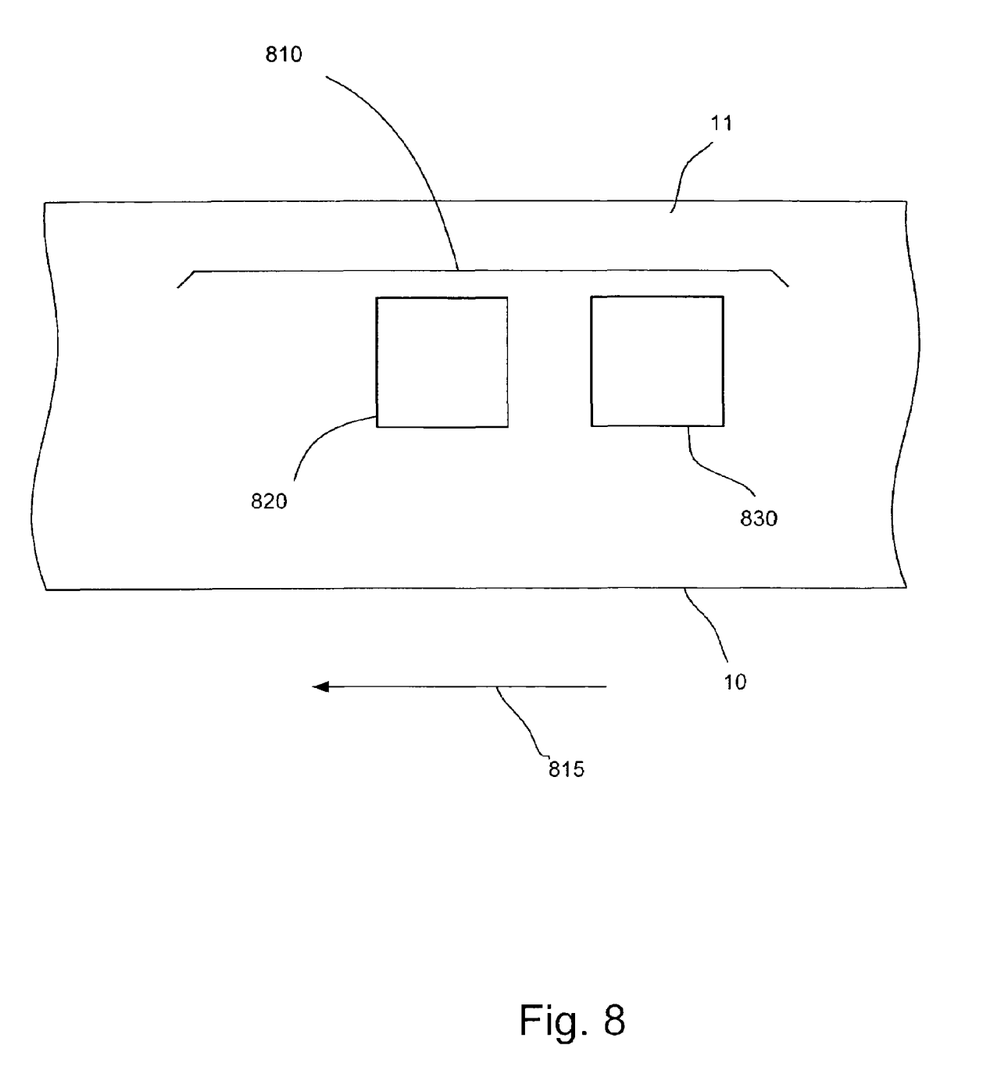
FIG. 8 illustrates a portion of a surface of a rod consistent with a further aspect of the disclosure.

Thus, for example, based on a velocity limit of rod 10 and the sampling rate, processor 18 can determine that rod 10 can only move a limited distance between sensed images e.g., 100 μm. Graphically, as shown in FIG. 8, if viewing area 315 of sensor 16 is initially positioned over surface portion 820, and rod 10 moves in the direction indicated by arrow 815, viewing area 315 may later be positioned over surface portion 830. In light of the limiting parameters noted above, however, the maximum distance that rod 10 can move on either side of area 820, between successive images, is represented by distance 810 in FIG. 8. Accordingly, processor 18 need only compare the image of portion 830 with stored images corresponding to rod positions falling within distance 810, instead of comparing the sensed image to each and every image stored in on-board memory 25. As a result, the identified rod location can be obtained more quickly.

As noted above, image data in on-board memory 25 may be in a compressed format. If so, data associated with the images obtained by sensor circuit 16 is preferably also compressed in a similar fashion, and then compared with the stored compressed images in order to obtain the location of rod 10.

In addition, it is noted that rod 10 is typically relatively clean after it has been manufactured, and thus image data stored in on-board memory 25 may have less noise than image data output by sensor circuit 16 after rod 10 has been in use. Accordingly, noise-related data, supplied by a known random number generator, for example, may be added to the stored image data before the comparison with the sensed image data is made. Accordingly, noise may be accounted for in comparing the sensed and stored image data so that a more accurate result can be obtained.

Returning to FIG. 7, after identifying a subgroup of stored images, a stored image corresponding to the sensed image is identified (step 730). A rod location corresponding to the stored image is also identified, and thus reported as the current location of rod 10 (step 740).

It is noted that processor 18 can use conventional techniques to find a best match between a sensed image and a stored image. Over time, however, surface 11 may wear so that the surface topology of rod 10 can change. Accordingly, as surface 11 becomes increasingly worn, matching the sensed image with a stored image can become more difficult. Thus, in step 750, once a rod location is identified, the corresponding stored image is replaced with the sensed image. On-board memory 25, therefore, is updated with recent surface images so that sensed images can continue to be matched with stored images even as the topology or surface roughness of rod 10 changes.

INDUSTRIAL APPLICABILITY

Consistent with an aspect of the present disclosure, a memory stores images of portions of a surface of a rod or other movable member, as well as corresponding locations of the rod. The images are typically of rod surface roughness. Sensed images of the rod surface are compared with the stored images, and the rod location corresponding to the best matching stored image is reported as the position of the rod. Accordingly, rod locations can be obtained without reference to a barcode, which is often difficult and time consuming to mark on the surface of the rod.

Since the rod surface roughness can change due to wear, however, the memory is updated with the sensed image whenever a rod location is identified. Thus, sensed images are compared with the stored images that reflect recent surface topology of the rod. As a result, the rod location can be accurately determined even though the surface roughness may vary over time.

Other embodiments of the disclosure will be apparent to those skilled in the art from consideration of the specification and practice of the disclosure herein. It is intended that the specification and examples be considered as exemplary only, with a true scope and spirit of the disclosure being indicated by the following claims.

What is claimed is:

1. A method of monitoring a position of a movable member, the movable member having a surface, the method comprising:

sensing an image of a portion of the surface of the movable member;

comparing the sensed image to one of a plurality of images stored in a memory, the memory also storing a plurality of locations of the moveable member, each of the plurality of locations being associated with a corresponding one of each of the plurality of images;

obtaining one of the plurality of locations stored in the memory in response to the comparison of the sensed image to the one of the plurality of images stored in the memory; and replacing the one of the plurality of images stored in the memory with the sensed image.

2. A method in accordance with claim 1, further comprising selecting one of the plurality of images from a subgroup of the plurality of images, the subgroup being determined based on a limiting parameter.

3. A method in accordance with claim 2, wherein the limiting parameter includes a velocity limit of the movable member.

4. A method in accordance with claim 2, wherein the limiting parameter includes an acceleration limit of the movable member.

5. A method in accordance with claim 2, wherein the limiting parameter includes a time difference between a first time in which a previous image of another portion of the surface of the movable member was sensed and a second time at which the image of the portion of the surface of the movable member is sensed.

6. A method in accordance with claim 1, wherein the sensing is performed with a sensor including a plurality of light sensing elements, the plurality of light sensing elements being arranged in a two-dimensional array.

7. A method in accordance with claim 6, wherein the sensor includes an optical mouse sensor.

8. A method in accordance with claim 1, wherein the image includes an image of a roughness of the portion of the surface of the movable member.

9. A method in accordance with claim 1, wherein the surface of the movable member includes a thermally sprayed coating.

10. A method of manufacturing a movable member, comprising the steps of:
 machining the movable member, the machining imparting a roughness to a surface of the movable member;
 generating a plurality of images, each of the plurality of images corresponding to a respective one of a plurality of portions of the surface of the moveable member;
 storing the plurality of images in a memory;
 associating each of the plurality of images with a corresponding one of a plurality of locations of the movable member; and
 storing each of the plurality of locations of the moveable member in the memory, the memory being configured to output one of the plurality of locations in response to a comparison between a sensed image of part of the surface of the moveable member and one of the plurality of images stored in the memory.

11. A method of manufacturing a movable member in accordance with claim 10, wherein successive ones of the plurality of images correspond to overlapping ones of the plurality of portions of the surface of the moveable member.

12. A position monitoring system, comprising:
 a movable member having a surface;
 a sensor configured to sense an image of the portion of the surface of the movable member;
 a memory storing a plurality of images and corresponding ones of a plurality of locations of the movable member; and
 a processor circuit configured to retrieve one of the plurality of locations of the moveable member stored in the memory in response to a comparison of the sensed image with one of the plurality of images stored in the memory, and replace the one of the plurality of images with the sensed image in the memory.

13. A position monitoring system in accordance with claim 12, wherein the processor circuit is further configured to select the one of the plurality of images from a subgroup of the plurality of images, the subgroup being determined based on a limiting parameter.

14. A position monitoring system in accordance with claim 13, wherein the limiting parameter includes a velocity limit of the movable member.

15. A position monitoring system in accordance with claim 13, wherein the limiting parameter includes an acceleration limit of the movable member.

16. A position monitoring system in accordance with claim 13, wherein the limiting parameter includes a previous position of the movable member.

17. A position monitoring system in accordance with claim 13, wherein the limiting parameter includes a time difference between a first time at which a previous image of another portion of the surface of the movable member was sensed, and a second time at which the image of the portion of the surface of the movable member was sensed.

18. A position monitoring system in accordance with claim 12, wherein the sensor includes a plurality of light sensing elements, the plurality of light sensing elements being arranged in a two-dimensional array.

19. A position monitoring system in accordance with claim 18, wherein the sensor includes an optical mouse sensor.

20. A position monitoring system in accordance with claim 12, wherein the image includes an image of a roughness of the portion of the surface of the movable member.

21. A position monitoring system in accordance with claim 12, wherein the surface of the movable member includes a thermally sprayed coating.

22. A position monitoring system in accordance with claim 12, wherein the surface of the movable member includes chrome.

23. A method in accordance with claim 1, wherein the stored image includes compressed data, the method further including compressing data associated with the sensed image.

24. A position monitoring system in accordance with claim 12, wherein the sensor includes a proximity sensor.

25. A method in accordance with claim 1, wherein the surface of the movable member includes chrome.

* * * * *

UNITED STATES PATENT AND TRADEMARK OFFICE
CERTIFICATE OF CORRECTION

PATENT NO. : 7,197,424 B2
APPLICATION NO. : 11/094383
DATED : March 27, 2007
INVENTOR(S) : Kucher et al.

It is certified that error appears in the above-identified patent and that said Letters Patent is hereby corrected as shown below:

On the Title Page:

Item (12), Below "United States Patent", in Column 1, Line 1, delete "Kucher" and insert --Kucher et al.--.

Item (75), under "Inventor", in Column 1, Line 2, after "Trent Steven Kucher, Peoria, IL (US)", insert --Kurtis C. Kelly, Washington, IL--.

Signed and Sealed this

Twenty Second Day of April, 2008

JON W. DUDAS
*Director of the United States Patent and Trademark Office*